United States Patent
Xu

(10) Patent No.: US 12,257,111 B1
(45) Date of Patent: Mar. 25, 2025

(54) DENTAL FLOSSER WITH COLLAR MEMBER FOR ADJUSTING FLOSS TENSION

(71) Applicant: Meng Xu, West Vancouver (CA)

(72) Inventor: Meng Xu, West Vancouver (CA)

( * ) Notice: Subject to any disclaimer, the term of this patent is extended or adjusted under 35 U.S.C. 154(b) by 0 days.

(21) Appl. No.: 18/637,956

(22) Filed: Apr. 17, 2024

(51) Int. Cl.
*A61C 15/04* (2006.01)

(52) U.S. Cl.
CPC .................. *A61C 15/046* (2013.01)

(58) Field of Classification Search
CPC ...... A61C 15/04; A61C 15/046; A61C 15/048
USPC .......................... 132/323, 324, 327
See application file for complete search history.

(56) References Cited

U.S. PATENT DOCUMENTS

| | | | |
|---|---|---|---|
| 1,512,633 A | | 10/1924 | Peckham |
| 2,873,749 A | * | 2/1959 | Borgtor ................ A61C 15/046 |
| | | | 132/327 |
| 3,236,247 A | | 2/1966 | Brockman |
| 3,993,085 A | | 11/1976 | Skinner |
| 4,655,233 A | | 4/1987 | Laughlin |
| 4,807,651 A | * | 2/1989 | Naydich ............... A61C 15/046 |
| | | | 132/323 |
| 4,832,062 A | | 5/1989 | Grollimund |
| 5,094,256 A | * | 3/1992 | Barth .................. A61C 17/0202 |
| | | | 132/327 |
| 5,113,880 A | | 5/1992 | Honda |
| 5,139,038 A | | 8/1992 | Gazayerli |
| 5,183,064 A | * | 2/1993 | Barth ................... A61C 15/048 |
| | | | 132/321 |
| 5,305,768 A | | 4/1994 | Gross |
| 6,155,274 A | | 12/2000 | Stein |
| 8,893,733 B2 | | 11/2014 | Welt |
| 2003/0226575 A1 | * | 12/2003 | Lee ....................... A61C 15/046 |
| | | | 132/327 |
| 2009/0241984 A1 | * | 10/2009 | Wall ..................... A61C 15/046 |
| | | | 132/323 |
| 2012/0180809 A1 | | 7/2012 | Bai |
| 2012/0279518 A1 | | 11/2012 | Alas |
| 2015/0059791 A1 | | 3/2015 | Sheppel |
| 2016/0067021 A1 | | 3/2016 | Zwimpfer |

(Continued)

FOREIGN PATENT DOCUMENTS

GB        2272161 A  *  5/1994   ........... A61C 15/046

OTHER PUBLICATIONS

Office Action issued on Jul. 21, 2022—U.S. Appl. No. 16/545,739.

(Continued)

*Primary Examiner* — Tatiana L Nobrega
(74) *Attorney, Agent, or Firm* — Jeffer Mangels; Butler & Mitchell LLP; Brennan C. Swain, Esq.

(57) ABSTRACT

A dental flosser that includes a U-shaped portion having first and second arms, a handle portion, a floss strand attachment member and a floss strand. The floss strand attachment member is movable distally and proximally with respect to the handle portion. The floss strand attachment member includes a collar member that at least partially surrounds the handle portion and defines a collar member interior. The floss strand has a length and a first end fastened to the first arm and a second end attached to the floss strand attachment member. The middle portion of the floss strand extends through a channel in the second arm. The floss strand attachment member is movable between a first position and a second position to increase the tension on the floss strand.

6 Claims, 5 Drawing Sheets

(56) References Cited

U.S. PATENT DOCUMENTS

| | | | |
|---|---|---|---|
| 2018/0140397 A1 | 5/2018 | Kozak | |
| 2018/0353274 A1* | 12/2018 | Horowitz | A61C 19/063 |
| 2019/0175318 A1* | 6/2019 | Oh | A61C 15/04 |
| 2021/0052357 A1* | 2/2021 | Xu | A61C 15/046 |

OTHER PUBLICATIONS

Office Action issued on Sep. 2, 2022—U.S. Appl. No. 16/545,739.
Office Action issued on Dec. 6, 2022—U.S. Appl. No. 16/545,739.
Office Action issued on Jun. 2, 2023—U.S. Appl. No. 16/545,739.
Office Action issued on Sep. 13, 2023—U.S. Appl. No. 16/545,739.
Office Action issued on Nov. 21, 2023—U.S. Appl. No. 16/545,739.
Response to Office Action issued on Jul. 21, 2022 (Response to Restriction Requirement)—U.S. Appl. No. 16/545,739.
Response to Office Action issued on Sep. 2, 2022—U.S. Appl. No. 16/545,739.
Response to Office Action issued on Dec. 6, 2022—U.S. Appl. No. 16/545,739.
Response to Office Action issued on Jun. 2, 2023—U.S. Appl. No. 16/545,739.
Response to Office Action issued on Sep. 13, 2023—U.S. Appl. No. 16/545,739.
Request for Continued Examination and Amendment filed Nov. 16, 2023.

* cited by examiner

DENTAL FLOSSER WITH COLLAR MEMBER FOR ADJUSTING FLOSS TENSION

FIELD OF THE INVENTION

The present invention relates in general to dental and oral cleaning devices and in particular to hand-held dental flossers (e.g., dental floss picks or dental floss holders) with means for adjusting floss tension, and to methods for making and using such dental flossers.

BACKGROUND OF THE INVENTION

The spaces between teeth and the surfaces of teeth in general can be cleaned by a variety of methods including brushing, machine-driven jets of water, toothpicks and the like, and by flossing with dental floss or dental tape or similar thread. Dental floss is a cord of thin filaments generally used to remove food and dental plaque from teeth.

One of the chief causes of caries (dental cavities) and a principal cause of periodontal (gum and root) disease is bacterial plaque formation that develops on tooth surfaces. When removed, new plaque can reform in less than 24 hours. Therefore, in order to maintain optimal dental hygiene and health, flossing should be carried out at least once per day.

Many people do not floss their teeth on a daily basis, because the manual procedure for using conventional dental floss is difficult and tedious. The use of a hand-held dental flosser (also known as a floss holder or a floss pick) has made flossing more convenient and less difficult. A dental flosser generally comprises two arms extending from a thin plastic body (or handle). A floss strand runs between the two arms. Conventional dental flossers are usually made of a rigid and inflexible plastic material, and the tension of the floss strand between the two arms is fixed.

A major shortcoming of conventional dental flossers is that the tension in the floss strand is fixed, so that the relatively high tension required to enable proper insertion of the floss strand between the teeth, which action requires the floss strand to remain tense, does not allow the floss strand to curve around the profile of the tooth away from the interdental space. As a consequence, proper cleaning of plaque and bacteria from surfaces of the teeth other than interdental surfaces is not readily performed.

Therefore, it is desirable to provide an improved hand-held dental flosser with means for adjusting floss tension and which is more effective for cleaning the tooth surfaces around the profile of the tooth (including the front surface, the back surface, and the interdental surface of the tooth).

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

In accordance with a preferred embodiment of the present invention there is provided a dental flosser that includes a U-shaped portion having a first arm and a second arm spaced apart from each other, where the second arm includes a channel defined therethrough, a handle portion that extends from the U-shaped portion, a floss strand attachment member and a floss strand. The handle portion includes a proximal end and a distal end, and the distal end is distant from the U-shaped portion. The handle portion includes a top surface, a bottom surface and opposing first and second side surfaces. The floss strand attachment member is associated with and movable distally and proximally (longitudinally) with respect to the handle portion. The floss strand attachment member includes a collar member that at least partially surrounds the handle portion and defines a collar member interior. The floss strand has a length and a first end and a second end. The first end of the floss strand is fastened to the first arm and the second end of the floss strand is attached to the floss strand attachment member. A middle portion of the floss strand extends through the channel such that a portion of the floss strand extends between the first and second arms. The floss strand attachment member is movable between a first position and a second position to increase the tension of the floss strand.

The handle portion may include at least first and second openings defined therethrough from the first side surface to the second side surface. The collar member may include a tooth that extends from a first inner surface into the collar member interior toward the first side surface of the handle portion and into the first opening when the collar member is in a first position. The floss strand attachment member is movable between the first position where the tooth is received in the first opening and the second position where the tooth is received in the second opening to increase the tension of the floss strand.

In a preferred embodiment, the collar member is movable transversely with respect to the handle portion such that the tooth moves from an engaged position where it is received in the first opening to a disengaged position where it is not received in the first opening. The collar member may include at least a first spring member that extends from a second inner surface into the collar member interior and against the second side surface of the handle portion to bias the tooth to the engaged position. The first spring member is compressed when the collar member is moved from the engaged position to the disengaged position. A first height is defined between the second inner surface of the collar member and the second side surface of the handle portion, the tooth defines a second height, and the first height is greater than the second height.

In a preferred embodiment, the collar member surrounds the handle portion. The collar member may include a connection system, whereby the collar member is removable from the handle portion. The handle portion and the U-shaped portion may be co-planar and define a first plane that bifurcates the handle portion and the U-shaped portion. However, this is not a limitation and the handle portion and U-shaped portion may not be co-planar. The tooth defines a first axis. The tooth includes a first end that is attached to the collar member and a second end opposite the collar member. The second end of the tooth can extend into the one of the first and second openings such that the first axis is perpendicular to the first plane.

One aspect of the invention relates to a hand-held dental flosser. The dental flosser comprises a U-shaped portion which has two spaced-apart arms (a first arm and a second arm), and a handle portion connected to the U-shaped portion. The dental flosser also comprises a floss strand. The floss strand comprises a first terminal end and a second terminal end. The first terminal end of the floss strand is fixedly attached to the first arm of the U-shaped portion such that the position of the first terminal end of the floss strand does not move relative to the first arm of the U-shaped portion. The location of this attachment may be at or near the end of the first arm of the U-shaped portion. The second terminal end of the floss strand is attached to a floss strand attachment member. A user can manipulate the floss strand attachment member either manually (or mechanically or electronically) to move the second terminal end of the floss strand to increase or decrease or maintain tension of the floss strand. A middle portion of the floss strand is slideably mounted on or in the second arm of the U-shaped portion such that a middle portion of the floss strand can slide relative to the second arm of the U-shaped portion. The channel prevents the floss strand from getting completely detached from the second arm of the U-shaped portion, but allows the floss strand to slide.

One aspect of the invention relates to a hand-held dental flosser. The dental flosser comprises a U-shaped portion which has two spaced-apart arms, a handle portion connected to the U-shaped portion, and a slide member portion separate from or detachably connected to the handle portion (or the U-shaped portion). In some embodiments, the U-shaped portion, the handle portion and the slide member portion are all made of a same suitable material (such as plastic) and are manufactured using an injection molding process. In some embodiments, the dental flosser is manufactured as a one-piece product, having the U-shaped portion, the handle portion and the slide member portion connected together. The slide member portion may be connected to either the handle portion or the U-shaped portion at a narrow connecting point, and a user can apply force at the narrow connecting point to break the slide member portion apart from the handle portion or the U-shaped portion so that the slide member becomes a separate component.

The dental flosser also comprises a floss strand. In some embodiments, the floss strand is injection molded with the dental flosser in situ. The floss strand has two ends. The first end of the floss strand is fastened to and embedded in the first arm of the U-shaped portion (i.e., the arm distal to the handle portion). The second end of the floss strand is fastened to and embedded in the slide member. There are a number of methods to securely fasten the ends of the floss strand. One example method is to let the end of the floss strand to extend out from the plastic during the injection molding process and to heat or burn the floss strand ends to coalesce into beads of diameter greater than the floss, which prevents the floss strand from being pulled out from the plastic.

A middle section of the floss strand passes through a channel inside the second arm of the U-shaped portion. This channel is created when the floss strand is injection molded with the dental flosser in situ. The middle section of the floss strand can slide inside the channel inside the second arm of the U-shaped portion.

The floss strand has three contact points (or contact regions) with the dental flosser. The floss strand has a first end which is fastened to the first arm of the U-shaped portion. This is the first contact point. The floss strand has a second end which is fastened to the slide member. This is the second contact point. Between its first end and its second end, the floss strand also contacts the second arm of the U-shaped portion by passing through the channel or some other mounting mechanism in the second arm of the U-shaped portion. This is the third contact point. In this sense, the function of the second arm of the U-shaped portion with respect to the floss strand is similar to a fixed pulley which enables the floss strand to be mounted on it and slide around it. The length of the floss strand between its two ends is fixed. However, the portion of the floss strand between the first and second arms of the U-shaped portion is adjustable by the user.

It should be understood that the adjustment of the tension of the floss strand is accomplished through the floss strand attachment piece (e.g., the slide member) which is connected to only one end of the floss strand, whereas the other end of the floss strand is securely fastened to one of the arms of the U-shaped portion. Therefore, one end of the floss strand is fixed, and the other end of the floss strand is moveable when the user moves or manipulates the floss strand attachment piece. This makes it easier for the user to fine-tune the tension of the floss strand, since the position of one end of the floss strand is fixed. U.S. Patent Publication No. 2021/0052357 is incorporated by reference herein in its entirety.

DETAILED DESCRIPTION OF THE PREFERRED EMBODIMENTS

Figure 1:
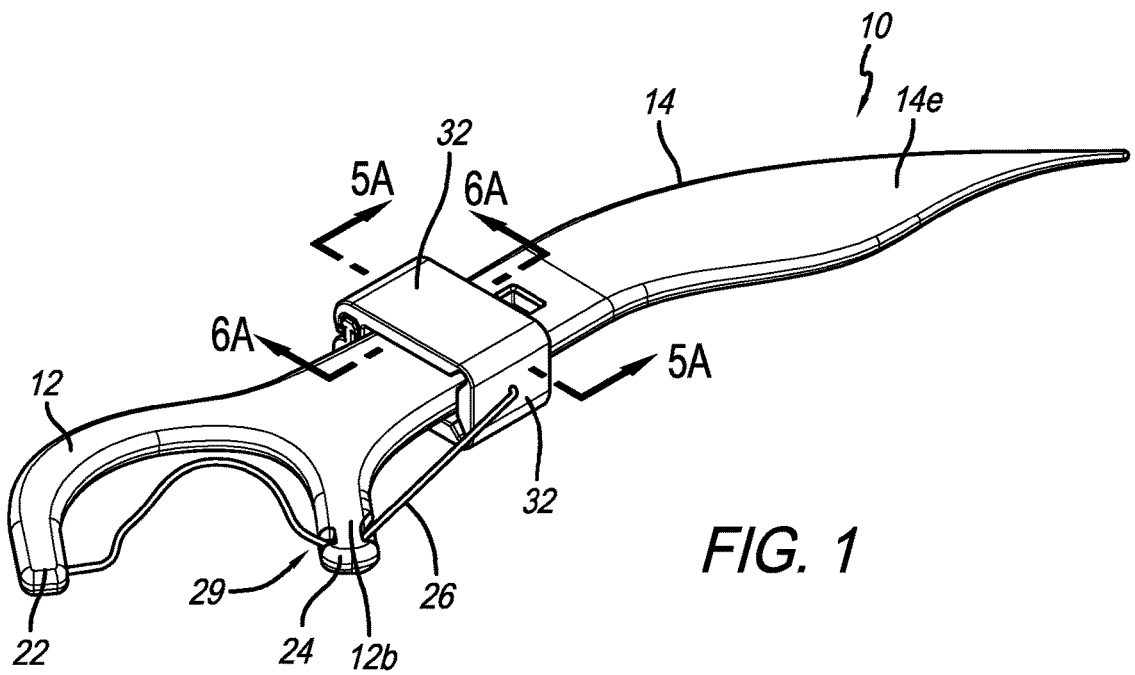
FIG. 1 is a perspective view of a flosser assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 2:
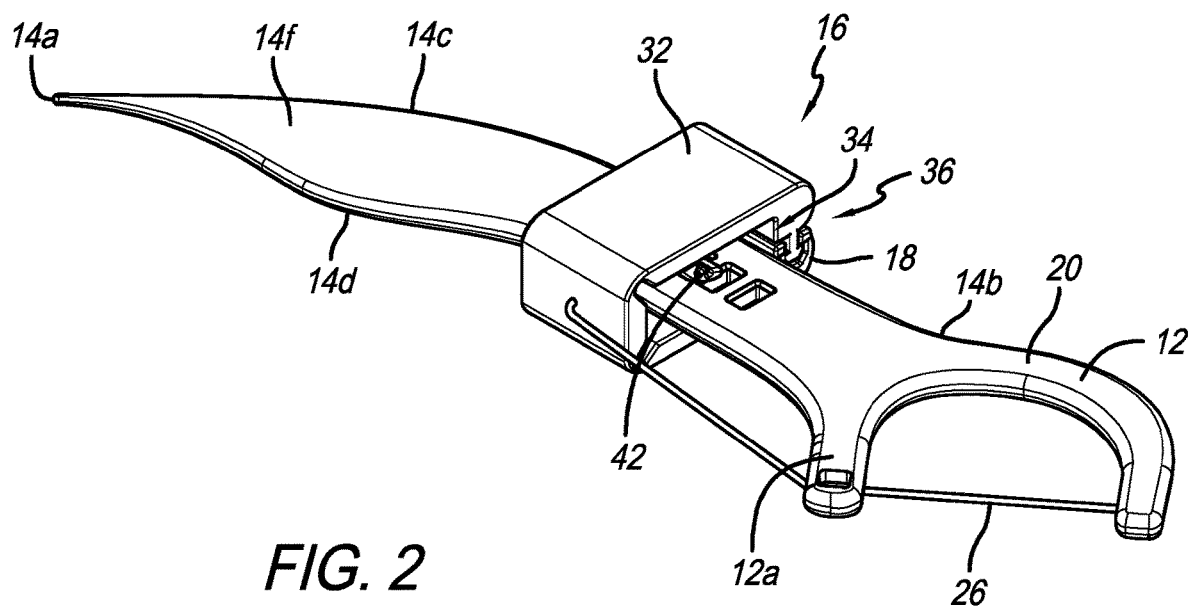
FIG. 2 is another perspective view of the flosser assembly of FIG. 1.

FIGS. 1 and 2 show a dental flosser 10 according to an example embodiment of the present invention. Dental flosser 10 comprises a U-shaped portion 12, a handle portion 14 and a detachable slide member portion 16. U-shaped portion 12 comprises a base 20 and a pair of spaced apart first and second arms 22 and 24 extending from base 20. In FIG. 1, the first and second arms 22 and 24 are shown oriented substantially parallel to one another, but it will be understood that they may be otherwise oriented to provide spaced apart ends.

A strand of dental floss 26 extends from first arm 22 to the second arm 24 and further to slide member portion 16. A first end of floss strand 26 is securely fastened to first arm 22. A second end of floss strand 26 is securely fastened to slide member portion or floss strand attachment member 16. Portions of the ends of floss strand 26 are embedded in first arm 22 and slide member 16. In the manufacturing process, dental flosser 10 is injection molded with floss strand 26 in situ, such that floss strand 26 passes through first arm 22, second arm 24, and slide member portion 16. Floss strand 26 can slide though a channel in arm 24. The ends of floss strand 26 are secured to first arm 22 or slide member portion 16.

U-shaped portion 12 and handle portion 14 are generally flat members. In the figures, the plane of U-shaped portion 12 is substantially the same plane as handle portion 14. Therefore, floss strand 26 when tensioned is on the same plane as the plane of handle portion 14. This feature makes it easier for the user to know the orientation of floss strand 26 when using dental flosser 10 by holding handle portion 14 to place floss strand 26 into interdental space between teeth. However, this is not a limitation and in other embodiments, the handle portion and U-shaped portion may not be co-planar.

Figure 3:
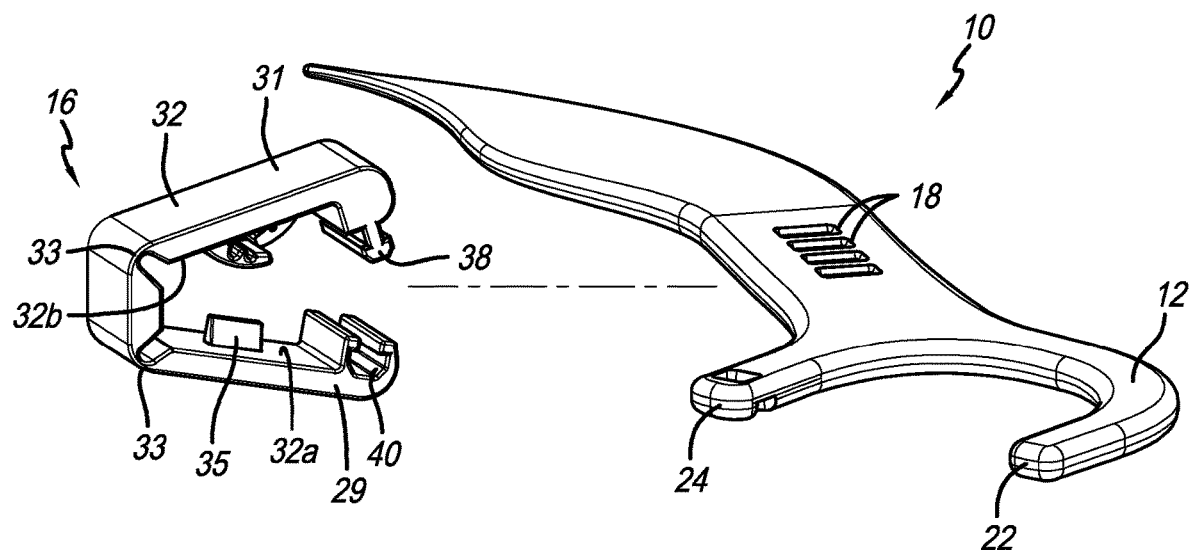
FIG. 3 is an exploded perspective view of the flosser assembly of FIG. 1.

In a preferred embodiment, the handle portion 14 includes a proximal end 14a and a distal end 14b. The distal end 14b is distant from the U-shaped portion 12 and the proximal end 14a is toward the end that is held by the user. The handle portion 14 includes a top surface 14c, a bottom surface 14d, a first side surface 14e and a second side surface 14f. As shown in FIG. 3, the handle portion 14 includes a plurality of openings 18 defined therethrough that extend from the first side surface 14e to the second side surface 14f.

The floss strand attachment member 16 is associated with and movable distally and proximally with respect to the handle portion 14. The floss strand attachment member 16 includes a collar member 32 that at least partially surrounds the handle portion 14 and defines a collar member interior 34. As shown in FIGS. 1 and 2, the collar member may completely surround the handle portion 14. The collar member 32 is movable longitudinally along the handle portion 14. Preferably, the collar member 32 may include at least one tooth 35 that extends from a first inner surface 32a into the collar member interior 34 toward the first side surface 14e of the handle portion 14 and into one of the openings 18 in the handle portion 14. The tooth may be omitted. In an embodiment without the tooth, in use, the collar member 32 (or floss strand attachment member 16) may be holdable in the second position by the user to maintain tension on the floss during the flossing procedure. The user may also pinch the collar member 32 (against the handle portion) to maintain the collar member 32 in the second position.

Figure 6A:
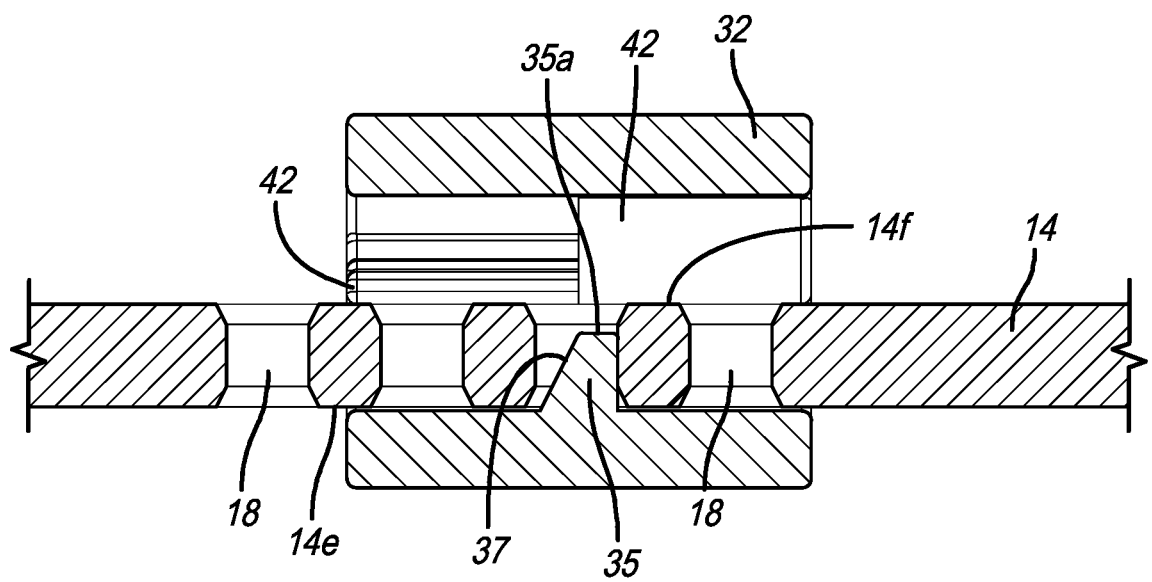
FIG. 6A is a cross-section of the floss strand attachment member taken along line 6A-6A of FIG. 1 with the collar member in the first and engaged position.

The handle portion 14 may include at least first and second openings 18. With two openings, the collar member 32 is movable along the handle portion 14 from a first position, as shown in FIG. 6A to a second position, as shown in FIG. 6D. In the first position, the tooth 35 is received in the first opening 18 and in the second position, the tooth 35 is received in the second opening 18. The collar member 32 may be removable from the handle portion 14 and may include a latch system or connection system 36. As shown in FIG. 3, the connection system 36 may include a protrusion portion 38 that is received in a trough portion 40 to secure the collar member 32 around the handle portion 14. A snap fit arrangement may be used between the protrusion portion 38 and the trough portion 40. However, any connection system or arrangement is within the scope of the present invention. For example, one or more of the following may be used, buttons, snaps, latches, hook and loop fastener or the like. The collar member 32 may also include one or more hinge portions 33 that allow the first collar portion 29 (that includes the protrusion portion 38 and the spring members 42) and the second collar portion 31 (that includes the trough portion 40 and the tooth 35) to move relative to one another. The hinge portion(s) may be a living hinge. The protrusion portion 38 and trough portion 40 may be reversed positionally.

Figure 4:
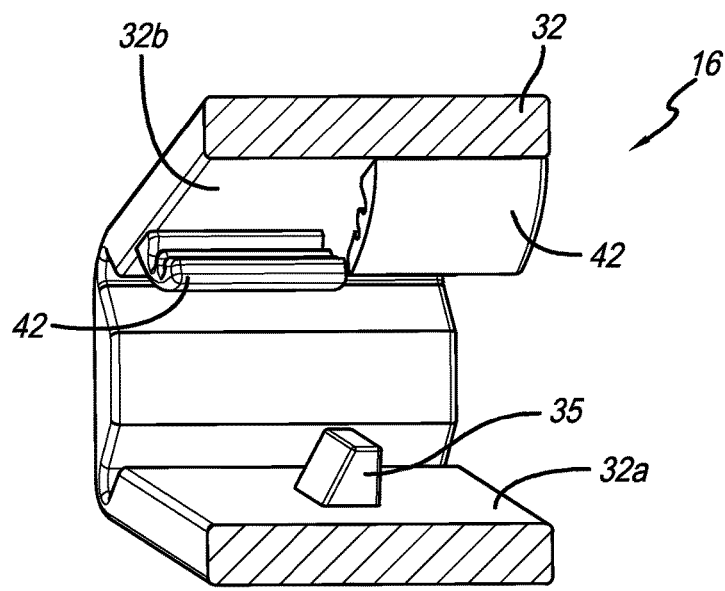
FIG. 4 is a perspective view of the floss strand attachment member, which a portion in cross-section.
Figure 5A:
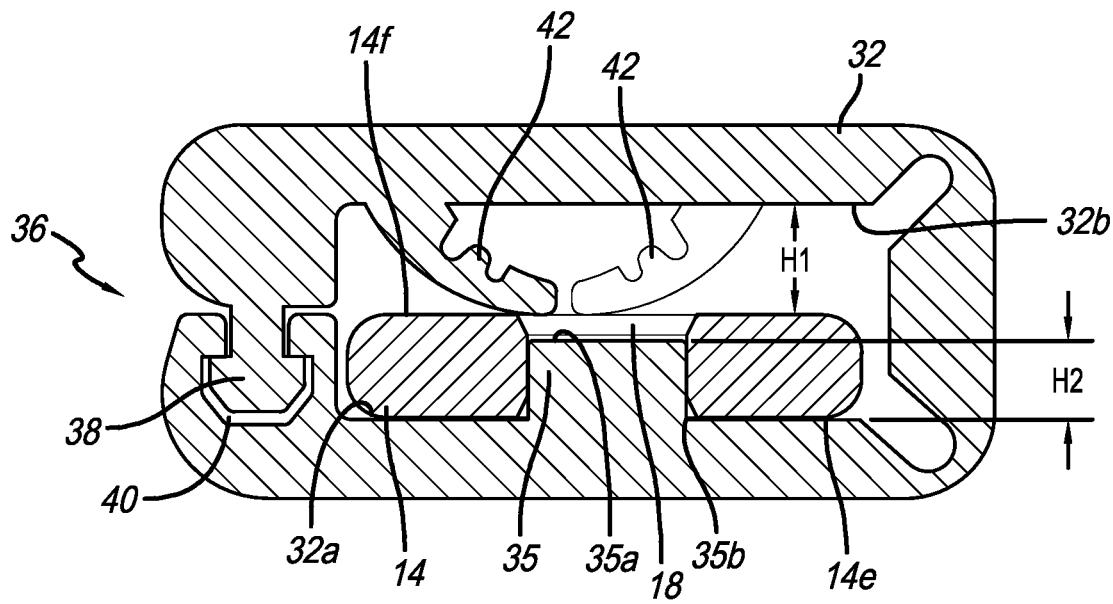
FIG. 5A is a cross-section of the floss strand attachment member taken along line 5A-5A of FIG. 1 with the collar member in the first and engaged positions.
Figure 5B:
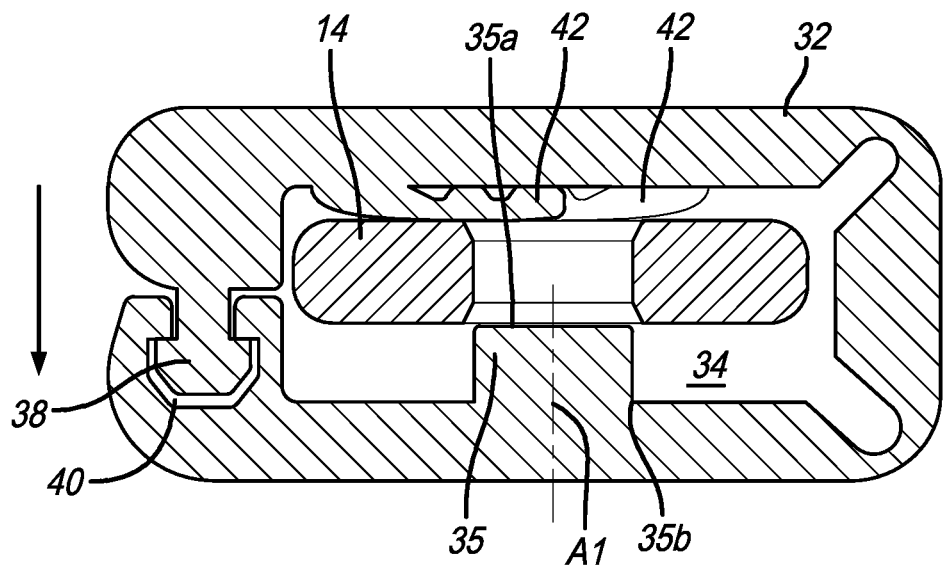
FIG. 5B is a cross-section of the floss strand attachment member with the collar member in the disengaged position.

As shown in FIG. 4, the collar member 32 may include one or more spring members 42 that extend from a second inner surface 32b into the collar member interior 34 and against the second side surface 14f of the handle portion 14. As shown in FIG. 5A, the spring members 42 bias the tooth 35 into an engaged position where the tooth 35 is received in one of the openings 18. As shown in FIG. 5B, the collar member 32 is movable transversely (the thickness direction through the handle portion) with respect to the handle portion 14. This allows the tooth 35 to be movable from the engaged position (FIGS. 5A and 6A) where it is received in the opening 18 to a disengaged position (FIGS. 5B and 6B) where it is not received in one of the openings 18. This movement is possible because of the dimensions of first height H1 and second height H2 shown in FIG. 5A. First height H1 is the distance between the second inner surface 32b of the collar member 32 and the second side surface 14f of the handle portion 14. Second height H2 is the distance between the first inner surface 32a of the collar member 32 (where the first end 35a of the tooth is connected to the collar member 32) and the second end 35b of the tooth 35 (e.g., the height of the tooth). See axis A1 in FIG. 5B that extends between first and second ends 35a and 35b of the tooth.

Figure 6B:
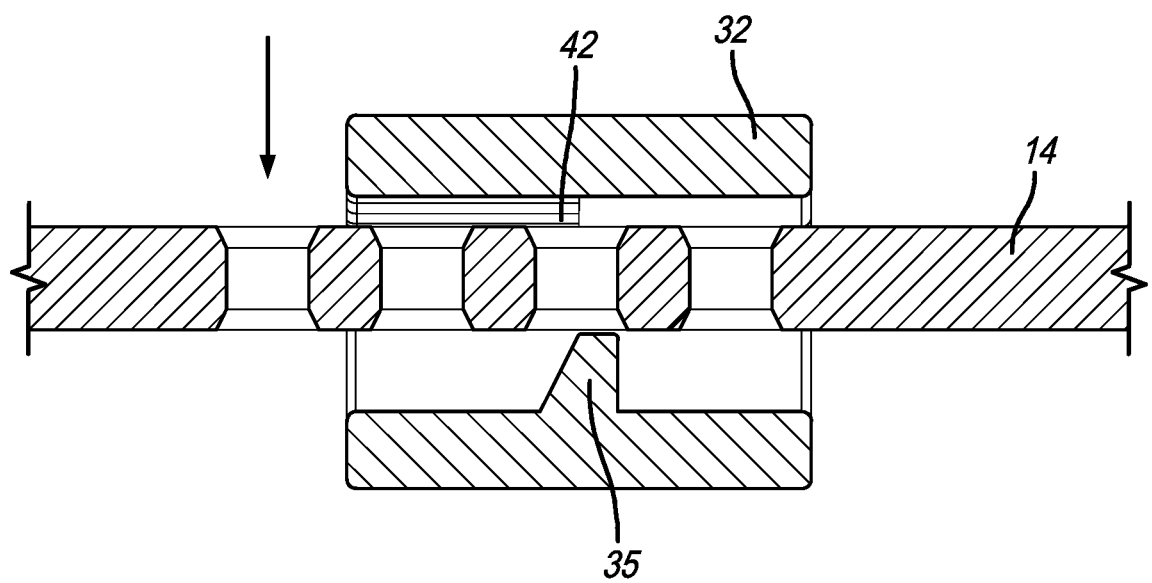
FIG. 6B is a cross-section of the floss strand attachment member with the collar member in the disengaged position.
Figure 6C:
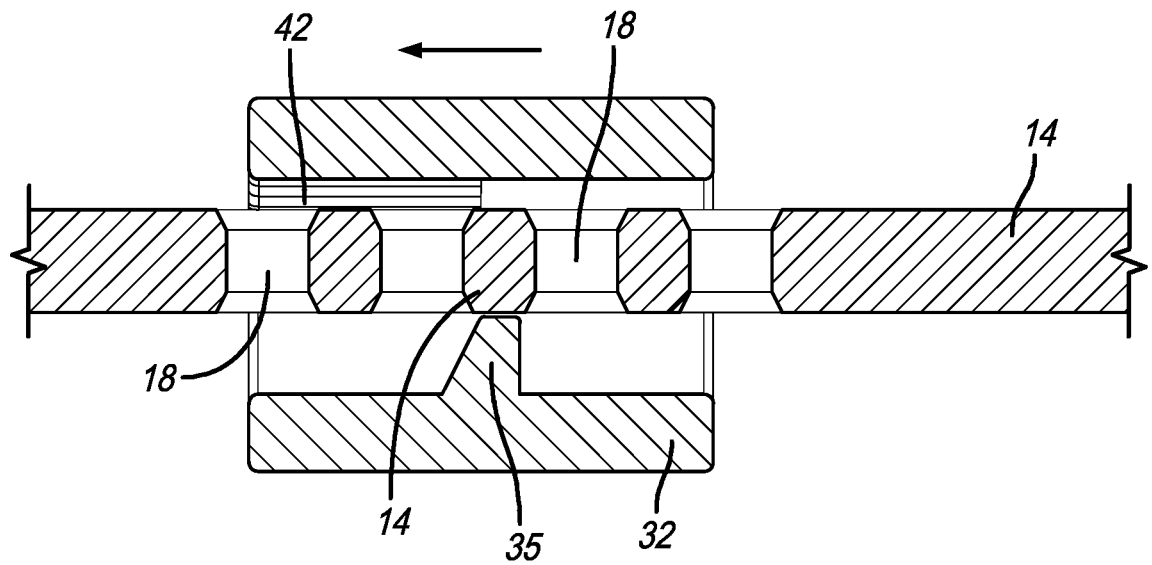
FIG. 6C is a cross-section of the floss strand attachment member with the collar member partially moved between the first and second positions.
Figure 6D:
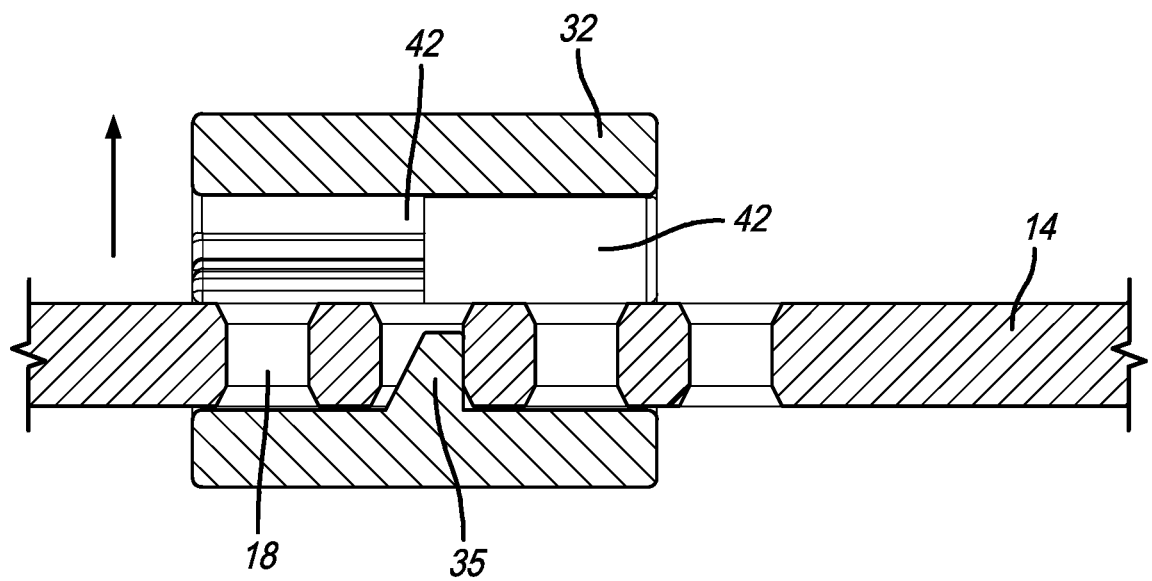
FIG. 6D is a cross-section of the floss strand attachment member with the collar member in the second and engaged position.

FIGS. 6A-6D show an exemplary set of movements to move the collar member 32 and tooth 35 longitudinally along the handle portion 14 between two adjacent openings 18. The descriptive movements and directions are based on the orientation of the FIGS. 6A-D. FIG. 6A shows the tooth 35 in a first opening 18 (a first position) and with the collar member 32 and tooth 35 in the engaged position. In this position, the spring members 42 are pushing against the second side surface 14f of the handle portion 14 and holding the tooth 35 in the first opening 18. As shown in FIG. 6B, a user pushes downwardly (see the arrow in FIG. 6B) to overcome the spring force of the spring members 42 and move the collar portion 32 from the engaged position to the disengaged position. In the disengaged position, the spring members 42 are compressed and the tooth 35 is out of the first opening 18. Next, as shown in FIG. 6C, the user moves the collar member 32 to the left (see the arrow in FIG. 6C). Once the tooth 35 passes the portion of the handle portion 14 between first and second openings 18, as shown in FIG. 6D, the tooth 35 enters the second opening 18 and the spring member(s) 42 bias the tooth 35 upwardly into the second opening downwardly (see the arrow in FIG. 6D). The tooth 35 may have an inclined surface 37 on one or both sides to help move the tooth 35 between openings 18.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A dental flosser comprising:
    a U-shaped portion having a first arm and a second arm spaced apart from each other, wherein the second arm includes a channel defined therethrough,
    a handle portion that extends from the U-shaped portion, wherein the handle portion includes a proximal end and a distal end, wherein the handle portion includes a top surface, a bottom surface and opposing first and second side surfaces, and wherein the handle portion includes at least first and second openings defined therein,
    a floss strand attachment member associated with and movable distally and proximally with respect to the handle portion, wherein the floss strand attachment member includes a collar member that at least partially surrounds the handle portion and defines a collar member interior, wherein the collar member includes a tooth that extends from a first inner surface into the collar member interior toward the first side surface of the handle portion and into the first opening when the collar member is in the first position,
    a floss strand having a length and a first end and a second end, wherein the first end of the floss strand is fastened to the first arm and the second end of the floss strand is attached to the floss strand attachment member, wherein a middle portion of the floss strand extends through the channel such that a portion of the floss strand extends between the first and second arms,
    wherein the floss strand attachment member is movable between a first position where the tooth is received in the first opening and a second position where the tooth is received in the second opening to increase the tension of the floss strand, wherein the collar member is movable transversely with respect to the handle portion such that the tooth moves from an engaged position where it is received in the first opening to a disengaged position where it is not received in the first opening, and wherein the collar member includes at least a first spring member that extends from a second inner surface into the collar member interior and against the second side surface of the handle portion to bias the tooth to the engaged position.

2. The dental flosser of claim 1 wherein the first spring member is compressed when the collar member is moved from the engaged position to the disengaged position.

3. The dental flosser of claim 2 wherein a first height is defined between the second inner surface of the collar member and the second side surface of the handle portion, wherein the tooth defines a second height, and wherein the first height is greater than the second height.

4. The dental flosser of claim 1 wherein the collar member surrounds the handle portion.

5. The dental flosser of claim 4 wherein the collar member includes first and second ends that are disconnectable from one another, whereby the collar member is removable from the handle portion.

6. The dental flosser of claim 1 wherein the tooth defines a first axis, wherein the tooth includes a first end that is attached to the collar member and a second end opposite the collar member, and wherein the second end of the tooth can extend into one of the first and second openings.

* * * * *